(12) United States Patent
Ding et al.

(10) Patent No.: US 8,005,639 B2
(45) Date of Patent: Aug. 23, 2011

(54) COMPACT FRAMEWORK FOR AUTOMATED TESTING

(75) Inventors: Ya Chao Ding, Hebei Province (CN); Guo Hua Zue, Beijing (CN)

(73) Assignee: Flextronics AP, LLC, Broomfield, CO (US)

( * ) Notice: Subject to any disclaimer, the term of this patent is extended or adjusted under 35 U.S.C. 154(b) by 401 days.

(21) Appl. No.: 12/204,541

(22) Filed: Sep. 4, 2008

(65) Prior Publication Data

US 2010/0057395 A1  Mar. 4, 2010

(51) Int. Cl.
*G06F 19/00* (2011.01)

(52) U.S. Cl. ........................................ 702/123

(58) Field of Classification Search .................. 702/123, 702/121, 108; 714/724, 734, 742
See application file for complete search history.

(56) References Cited

U.S. PATENT DOCUMENTS

| | | | |
|---|---|---|---|
| 2004/0225465 A1 * | 11/2004 | Pramanick et al. | ........... 702/119 |
| 2004/0268308 A1 | 12/2004 | Srivastava et al. | |
| 2007/0220341 A1 | 9/2007 | Apostoloiu et al. | |
| 2008/0163015 A1 | 7/2008 | Kagan et al. | |

* cited by examiner

*Primary Examiner* — Bryan Bui

(74) *Attorney, Agent, or Firm* — Libby A. Huskey; Robert G. Crouch; Marsh Fischmann & Breyfogle LLP

(57) ABSTRACT

A system and method ("utility") for automated testing using a compact framework is provided. The utility includes a plurality of functionalities that include development of a test module, development of a test flow, and execution of a test flow. Each of these functionalities may be separated by the compact framework, such that automated testing functions may be divided into individual roles. The individual roles may include test developer, test flow designer, and test flow executor. The utility may also include an authenticator that is operable to determine the individual role of a user (e.g., using a GUI), and to provide the functionality that corresponds to that role. The utility may provide one or more displays that provide real time data feedback. Further, the utility may be operable to generate customized test results reports that enable a user to analyze the performance of one or more devices under test.

19 Claims, 10 Drawing Sheets

COMPACT FRAMEWORK FOR AUTOMATED TESTING

BACKGROUND

In the design and manufacture of electronic devices, there is a need to validate designs and to ensure that devices provide desired functionality and features. As a result, automated testing has been developed whereby the functionality and features of electronic devices may be tested and verified. As the tested devices have grown in complexity, more complex automated testing systems have also been developed.

Accurate and reliable testing of a device may be crucial to the successful development and production of the device. A flaw in the automated testing procedure may falsely reflect on the performance of the device, thereby causing delays in development and unnecessary losses in production. As such, accurate and reliable testing of a device is crucial to effectively and efficiently developing or manufacturing a product.

The requirements of accurate and efficient automated testing are heightened in a situation where the automated testing is used to assess a product during research and development. Whereas an automated test used for a device in production may not change frequently, an automated test used during research and development may need to provide the ability to rapidly modify tests and generate new tests with short test development times in order to meet the changing testing demands associated with the research and development process.

Automated tests have been carried out using a program operative to control a testing device and gather data with regard to that device. This has traditionally required various contributions from different personnel to ensure proper test development. For instance, a computer programmer might produce the source code through which the automated test is carried out. However, it is likely that the computer programmer coding the automated test has little or no insight into the requirements for the overall testing routine or test flow. The computer programmer, or other like person, developing the testing program may not know what features or components of a new device need to be tested, nor may he or she know the order, total number of tests, or variety of tests necessary for a full assessment of the device. As such, a domain professional (e.g., a testing engineer) may be required to assist the computer programmer in fully capturing the facets of the device that need to be tested. This burdens both the person developing the testing program and the domain professional, causing the development of the testing program to increase in cost and complexity.

Further, a third person may carry out the execution of the tests. In this case, the third person may be required to be as versed in the development and design of the testing program as the computer programmer and testing engineer in order to properly execute the test. In this regard, the development of the testing process must either involve complex coordination and communication across many various sources, or a single, highly trained person that is familiar with the entire test program development, design, and execution. In either instance, the added cost and complexity lead to undesirable conditions for the creation of an automated testing system, especially one designed for products in research and development.

Additionally, the control of ancillary systems (such as graphical user interfaces, computer hardware, communication devices, etc.) necessary to properly carry out the development, design, and execution of the testing programs often has to be redeveloped with each successive testing program created. This leads to increased complexity requiring more time and money to effectively develop, design, and execute testing programs. Changes to tests often require completely new programs, requiring ground-up development of a testing program with each new program. This may lead to long lead times in development and execution of testing programs.

It is against this background that the compact framework for automated testing has been invented.

SUMMARY

The following embodiments and aspects thereof are described and illustrated in conjunction with systems, tools, and methods which are meant to be exemplary and illustrative, and not limiting in scope. In various embodiments, one or more of the above-described problems have been reduced or eliminated, while other embodiments are directed to other improvements.

According to a first aspect, a system for automated testing using a compact framework is provided that includes a plurality of functionalities that include development of a test module, development of a test flow, and execution of a test flow. Additionally, the system includes an authenticator that determines a characteristic of a user such that the functionality provided to the user is defined by the characteristic. Further, the system includes a graphical user interface that corresponds to the plurality of functionalities.

Further refinements of this aspect may include automated test equipment operative to execute the compact framework and may further include testing hardware to operably connect the automated test equipment to a device or unit under test. Moreover, one embodiment may include a data display that is operable to display real time data regarding the execution of a test flow. This data may be displayed in graphical form as well. Also, one embodiment may include a result processor to format data gathered during the execution of a test flow. The development and execution of a test module may include providing and executing source code, and/or specifying one or more external procedure calls. After developing the test modules and relevant functionality according to a new test requirement (e.g., testing for a new technology or product), the compact framework may load the developed components and execute them in the system.

According to another aspect, a method of automated testing using a compact framework, such that the compact framework is executed and determines a characteristic of a first user is provided. Additionally, the method includes defining one or more functionalities including development of a test module, development of a test flow, and execution of a test flow. The method also includes providing at least one of these functionalities to the first user dependent upon the user characteristic.

In one embodiment of this aspect, the test flow is defined by a plurality of test modules. Additionally, one embodiment of the current aspect may include displaying real time data describing the execution of the compact framework. An embodiment of the method may further include discontinuing the functionality of a first user and providing a different functionality to a second user. Also, the data gathered while executing a test module may be formatted into a report format that is determined by the user.

The method may also include an embodiment in which the execution of a test flow may be paused either by pausing the currently running thread, pausing at the completion of the currently running test module, or both.

According to another aspect, a compact framework for automated testing including a test development module operative to develop and define a test module is provided. The compact framework also includes a plurality of test modules having parameter and result data that describes the configuration and result processor of the test module, such that each test module may be executed with different parameter and result data. The compact framework also includes a configuration module operative to define a test flow comprising at least one of the test modules and an execution module operative to execute the test flow. Additionally, the test development module, configuration module, and execution module are based on the characteristic of a user. The compact framework of this aspect may also include embodiments wherein a report result is generated by the compact framework that can be formatted in response to a user's requirement.

In addition to the exemplary aspects and embodiments described above, further aspects and embodiments will become apparent by reference to the drawings and by study of the following descriptions.

DETAILED DESCRIPTION

Reference will now be made to the accompanying drawings, which at least assist in illustrating the various pertinent features of the present invention. In this regard, the following description is presented for purposes of illustration and description and is not intended to limit the invention to the form disclosed herein. Consequently, variations and modifications commensurate with the following teachings, and skill and knowledge of the relevant art, are within the scope of the present invention. The embodiments described herein are further intended to enable others skilled in the art to utilize the invention in such or other embodiments and with various modifications required by the particular application(s) or use (s) of the present invention.

Figure 1:
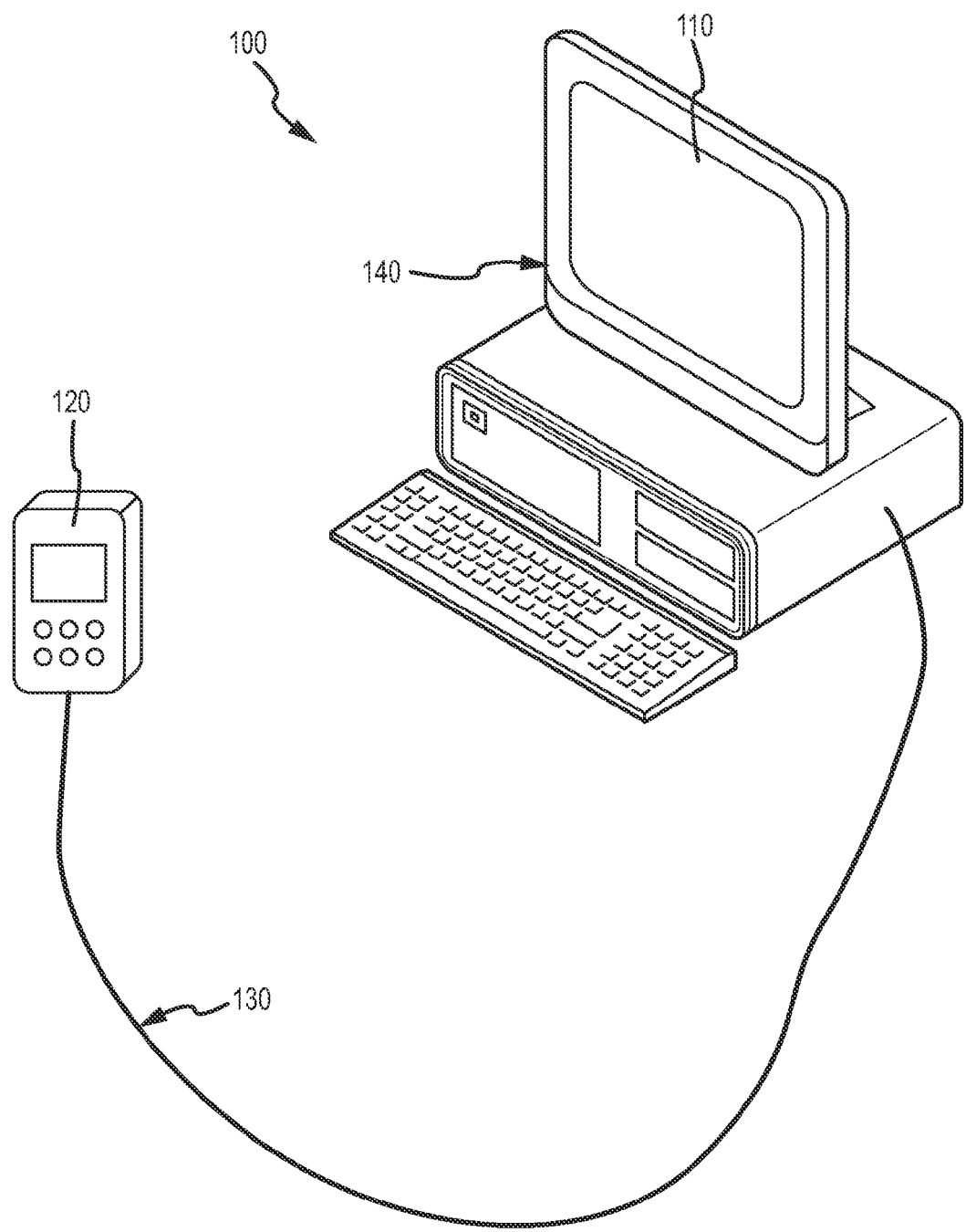
FIG. 1 is a schematic of one embodiment of an automated testing system.

Turning to FIG. 1, one embodiment of an automated testing system 100 of the present invention is shown. The system 100 includes automated testing equipment (ATE) 110 in operative communication with a unit under test (UUT) 120. The UUT 120 may be any type of hardware, software, or combination thereof. The communication between the ATE 110 and the UUT 120 may be accomplished via testing hardware 130. The testing hardware 130 may by any cable, series of cables, a physical hardware interface, a software implemented communication/control interface, connector(s), or any other coupling that allow for operative communication between the UUT 120 and the ATE 110. Additionally, the testing hardware 130 may provide other test instruments, sensors, actuators, or other devices that are necessary to perform testing as further described below. A graphical user interface (GUI) 140 is operative to receive inputs and commands from a user to control the ATE 110. The ATE 110 may be a computer having a microprocessor, memory, and other related hardware such as a display, keyboard, mouse, and the like. The ATE 110 of the present embodiment may be operative to execute a compact framework.

In the present embodiment, the compact framework is a computer program that controls the ATE 110 to perform testing functions on a UUT 120. The UUT 120 in the present embodiment may be a device that is in a research and development stage prior to production of the device. More specifically, the UUT 120 may be a cellular telephone, PDA, computer, or any other electronic device.

The compact framework carries out testing on the UUT 120 by executing one or more test sequences to validate the functionality of the UUT 120. The test sequences are defined in the compact framework as test modules, which may be compiled to define a test flow, or series of test modules to be executed in a single test flow. The test modules provide instructions to the ATE 110 to perform a test on the UUT 120. This may include providing inputs to the UUT 120, monitoring parameters of the UUT 120 in response to certain testing conditions, or the like. Test modules may be developed and modified to test specific functionalities of the UUT 120, UUT components, or the like.

Data may be gathered in response to the tests performed by the ATE 110. In the present embodiment of the automated testing system 100, the data may be gathered in raw form, representing the data recorded directly in the compact framework. The gathered raw data may then be converted to a results report that is human readable and may be used by engineers, designers, and the like to evaluate the UUT 120. Also, the raw or formatted data may be stored in a database or other storage medium for later review or further results processing. As the UUT 120 may be a complex device with many components and functions, many test subroutines or test modules may need to be employed to fully assess the performance of the UUT 120. As such, multiple test modules may be added to a test flow in order to perform different testing subroutines during a single test flow. That is, the test flow may be a series of test modules to be executed sequentially to test the UUT 120.

Many different products may be developed that need to be tested using the above modalities. Further, changes to existing products may give rise to the need to alter, modify, or create new tests. This need to modify or create new tests is heightened when a product is in research and development due to the rapid pace of development leading to changes in both devices as a whole and functions provided by them. As new products are continually being developed, the compact framework is suitable to test a variety of devices and components and provides the ability to rapidly modify test procedures to accommodate the varying test conditions needed.

Accordingly, in the present embodiment, test module development, test flow design, and test flow execution all constitute distinct functionalities provided by the compact framework. These functionalities are provided to users with responsibility for each task associated with each functionality. In this way, each functionality provided by the compact framework can be tailored to a specific user role to eliminate complexity and difficulties. This may include providing functionality-specific GUIs 140 for each functionality. As such, each user with a role specific task may be presented with the specific functionality of the compact framework associated with accomplishing that task. A specific GUI 140 may be provided for each functionality. However, as each functionality is performed within a single compact framework, any overlap between functionality sets may be provided for as well. That is, a test module developer may not need to have any knowledge with regard to the test flow design, and a test flow designer may not need to have any knowledge with regard to the test flow module development. Although both tasks are accomplished using the compact framework, the functions are separated from each other, each task may be completed in relative isolation.

For example, consider the situation in which a new feature is added to a device and therefore needs a new test to assess this feature. Assuming there is no existing test module capable of testing the new functionality, a test module developer would have to generate a new test module that encapsulates a testing subroutine to validate the effectiveness of the new feature. The test module developer would then be able to develop a module without any knowledge of the context of the test flow in which it will be used. Similarly, a test flow designer, having no knowledge of how the test module was developed, would be able to employ the newly developed test module to test the new functionality by designing a test flow incorporating the new test module. As two users perform these tasks, and the two users need not understand the tasks performed by the other, the functionalities needed to employ each can be simplified and optimized for the specific task by tailoring the functionality to the type of user who will be executing each of the functionalities.

Figure 2:
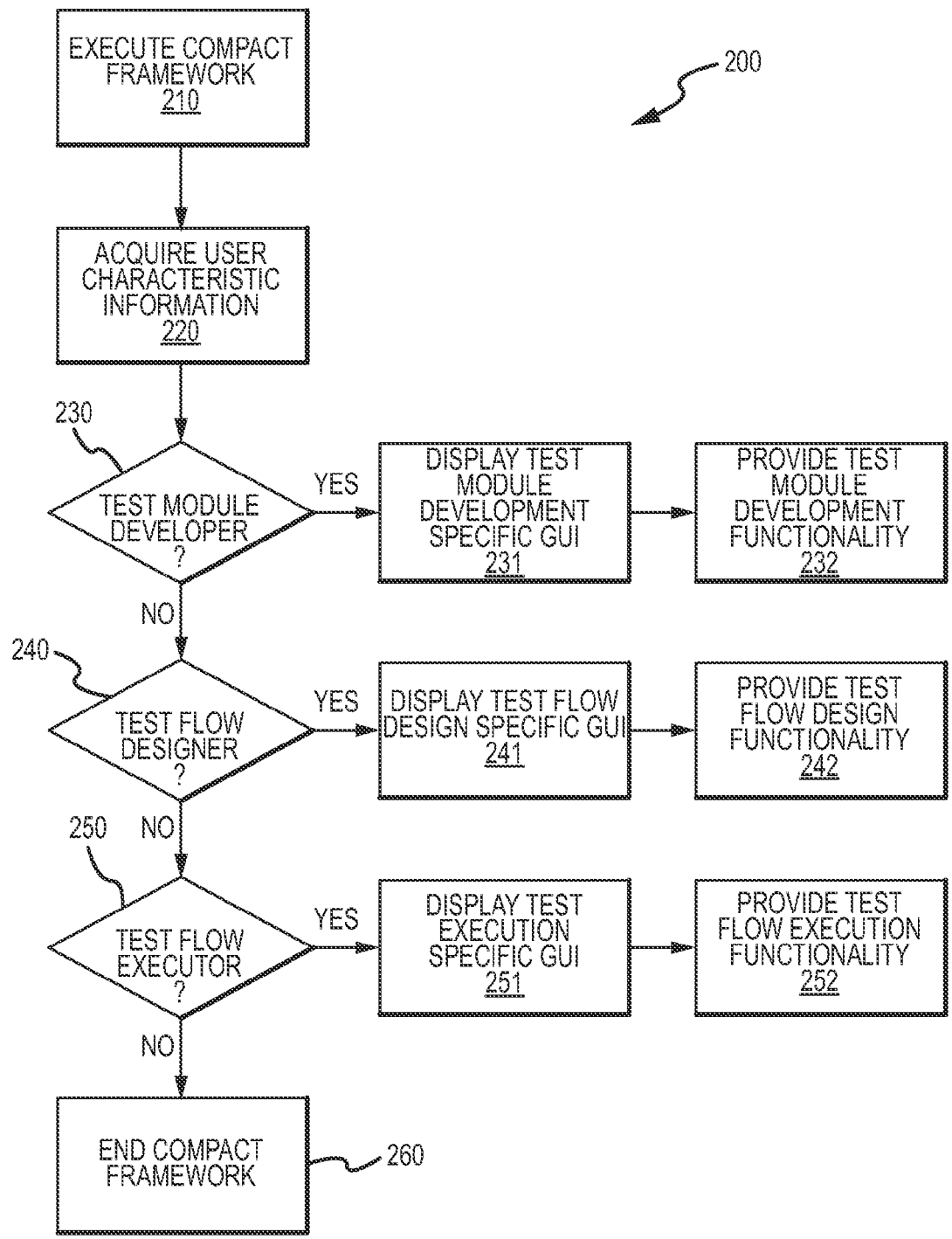
FIG. 2 is a flowchart depicting the execution of an exemplary compact framework.

Turning now to FIG. 2, a flowchart 200 that depicts the operation of a compact framework is shown. The operation of the compact framework commences at step 210 where the ATE 110 (see FIG. 1) initiates the execution of the compact framework. The compact framework then acquires information about a user at step 220 using, for example, a graphical user interface. This user information may include a user login identification and password, or any other distinguishing identifier of a user. Once identified, a user may have been previously defined within the compact framework to have certain characteristics. This may be a single characteristic given to a user, or may be multiple characteristics. Further still, a user may be associated with all characteristics. This acquired user information at step 220 is used to determine what functionalities are accessible by the user in steps 230, 240, and 250. One embodiment of the present invention includes three characteristics, including test module developer 230, test flow designer 240, and test flow executor 250. These characteristics correspond to the functionalities including: development of a test module 232, design of a test flow 242, and executing a test flow 252, respectively. The execution of these functionalities is further described below.

In FIG. 2 at step 230, the compact framework determines if the acquired user character information corresponds to that of a test module developer. If so, the compact framework displays a functionality specific GUI 140 that corresponds to a test module developer at step 231. The user then has access to the compact framework functionality to develop test modules at step 232. At step 240, the acquired user characteristic information from step 220 is evaluated to determine if the user has a characteristic associated with a test flow designer. Again, if so, the compact framework displays a specific GUI 140 associated with test flow design at step 241 that provides access to test flow design functionality at step 242. Similarly, at step 250 the compact framework determines if the user has a test flow executor characteristic. If so, the compact framework displays a test execution specific GUI 140 at step 251 giving the user access to the functionalities of the framework associated with test flow execution at step 252.

It should be understood that a user may possess two user characteristics and therefore have access to perform two associated functionalities. As an example, a user may have characteristics for both test module developer 230 and test flow executor 250. In this case, the user would have access to the functionalities for development of test modules 232 and execution of test modules 252. It should also be understood that a user may have all characteristics and have access to perform all functionalities 232, 242, and 252. Further, while the current embodiment includes three characteristics corresponding to three functionalities, other systems with differing numbers of characteristics and corresponding functionalities are contemplated.

Figure 3:
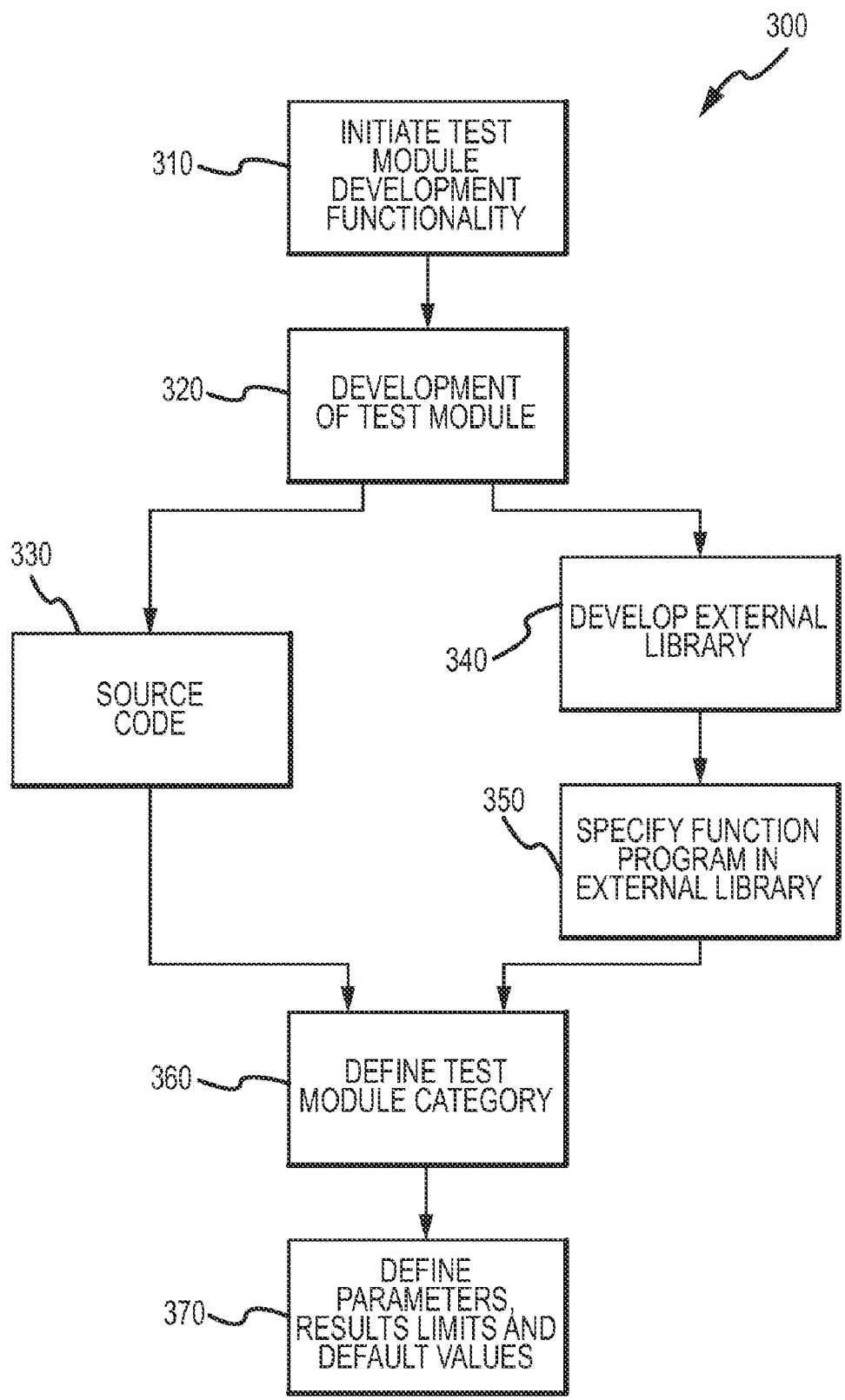
FIG. 3 is a flowchart depicting the functionality for developing a test module.

The functionality for development of a test module 232 is depicted in greater detail in a flowchart 300 shown in FIG. 3. The test module is generally a set of instructions for controlling the ATE 110 that provide a specific test function. In this regard, as the UUT 120 is developed, new or modified tests may be required. Accordingly, new and different test modules may be developed to satisfy this requirement. To facilitate the rapid development and modification of test modules, the compact framework provides test module development functionality initiated within the framework at step 310 in response to the determination that a user has a characteristic (s) enabling that user to access the functionality of developing a test module. At step 320 the developer may input commands via the functionality specific GUI 140 (see FIG. 1). The functionality specific GUI 140 provides the user with control of the functionalities associated with development of a test module 232 such that the user may access and perform that functionality.

The test module developer 230 may have at least two potential ways of developing or modifying a test module. At step 330, the test module developer may directly enter source code through the functionality specific GUI 140. This source code represents control instructions that may be used by the ATE 110 to perform one or more tests on a UUT 120. The source code generated at step 330 may be compiled and loaded by the framework in order to generate the test module.

Additionally or alternatively, the test module developer may develop an external library at step 340. This external library may include a dynamic link library or other external data used by the framework to perform the desired function of the test module.

Once the developer has either entered source code at step 330 or developed and specified an appropriate external library at steps 340 and 350, the developer may then assign the test module to a category at step 360. As explained further below, test modules may be organized by category in order to assist test flow designers when they are selecting tests to be performed on a UUT. Additionally, each test module may require parameter definitions, result limits, and default values to be defined by the developer at step 370. The parameter definitions include parameter values that are needed to perform the test subroutine of the test module. While these parameters may also be entered by the test executor as explained further below, the test module developer may define the function of the parameters and establish what parameters are necessary to carry out the test performed by the test module. The test module developer also defines result limits and default values at step 370. Each parameter, result limits, and default value defined by the test developer at step 370 may be stored in memory with the test module. In this regard, the test module may serve as a predefined test subroutine that may be utilized in various test flows to test one or more devices. Moreover, as the functionalities of test module development and test flow design are distinct functionalities, a test module developer does not need to have any knowledge about the design of the test flow, as the data required to run each test module is distinct and stored with the test module.

Figure 10:
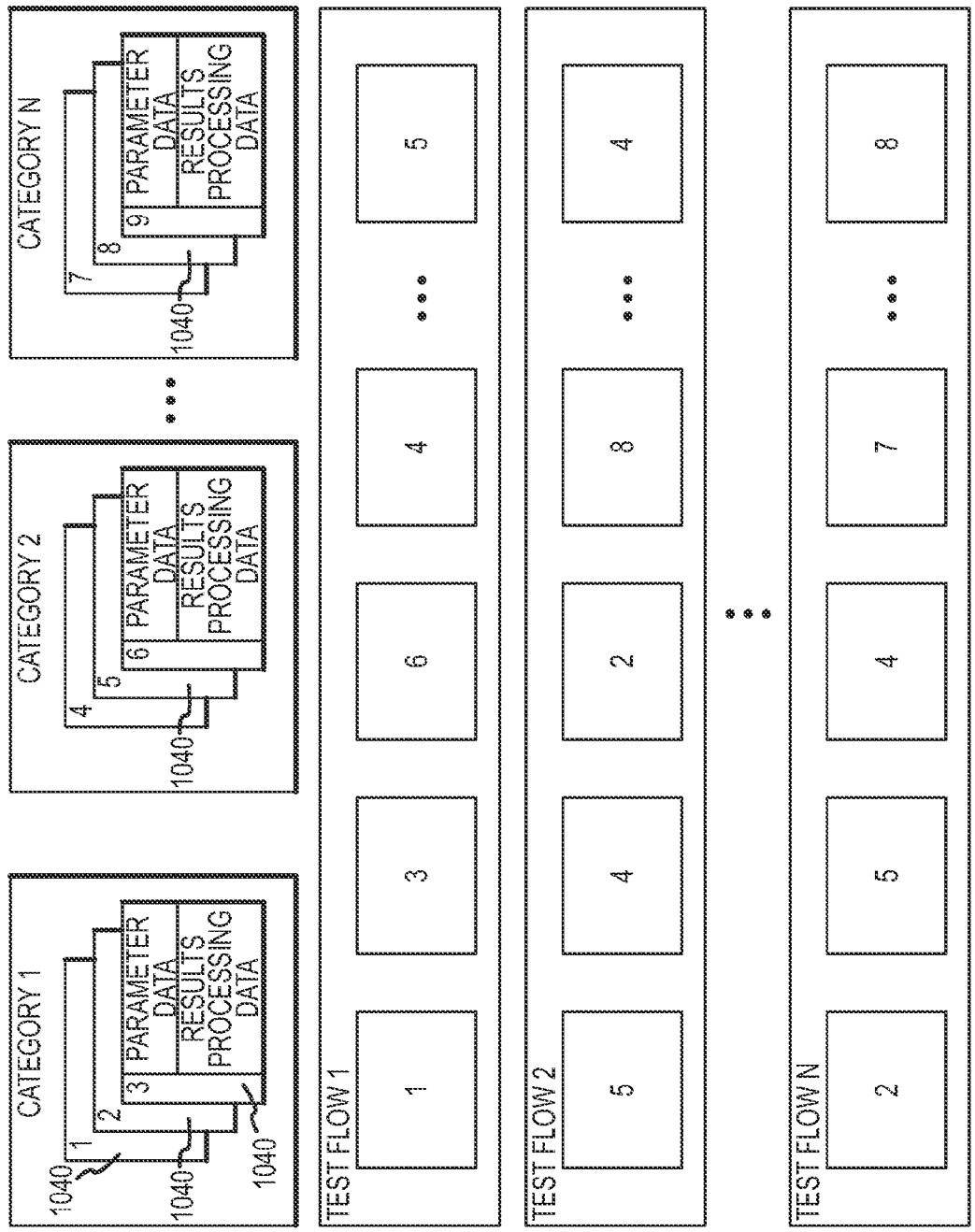
FIG. 10 is a schematic drawing showing the organization of test flows and test modules.

Referring now to FIG. 10, a schematic drawing showing the organization of test modules and test flows is shown. As in shown in FIG. 3, a test module developer defines a category (e.g., Category 1, Category 2, Category n) for each test module at step 360. It should be understood that while three categories are shown in FIG. 10, the number of categories is not limited. By way of explanation, Category 1 contains three test modules 1040 (labeled 1, 2, and 3). It is therefore to be understood that in the test module development of test modules 1, 2, and 3, the test module developer has defined that each of these test modules would be associated with Category 1. Similarly, test modules 4, 5, and 6 were defined as belonging to Category 2, and test modules 7, 8, and 9 were defined as belonging to Category n. As shown in the top test module of each category (i.e., test modules 3, 6, and 9), each test module has defined parameter data and results processing data unique to each test module.

Figure 4:
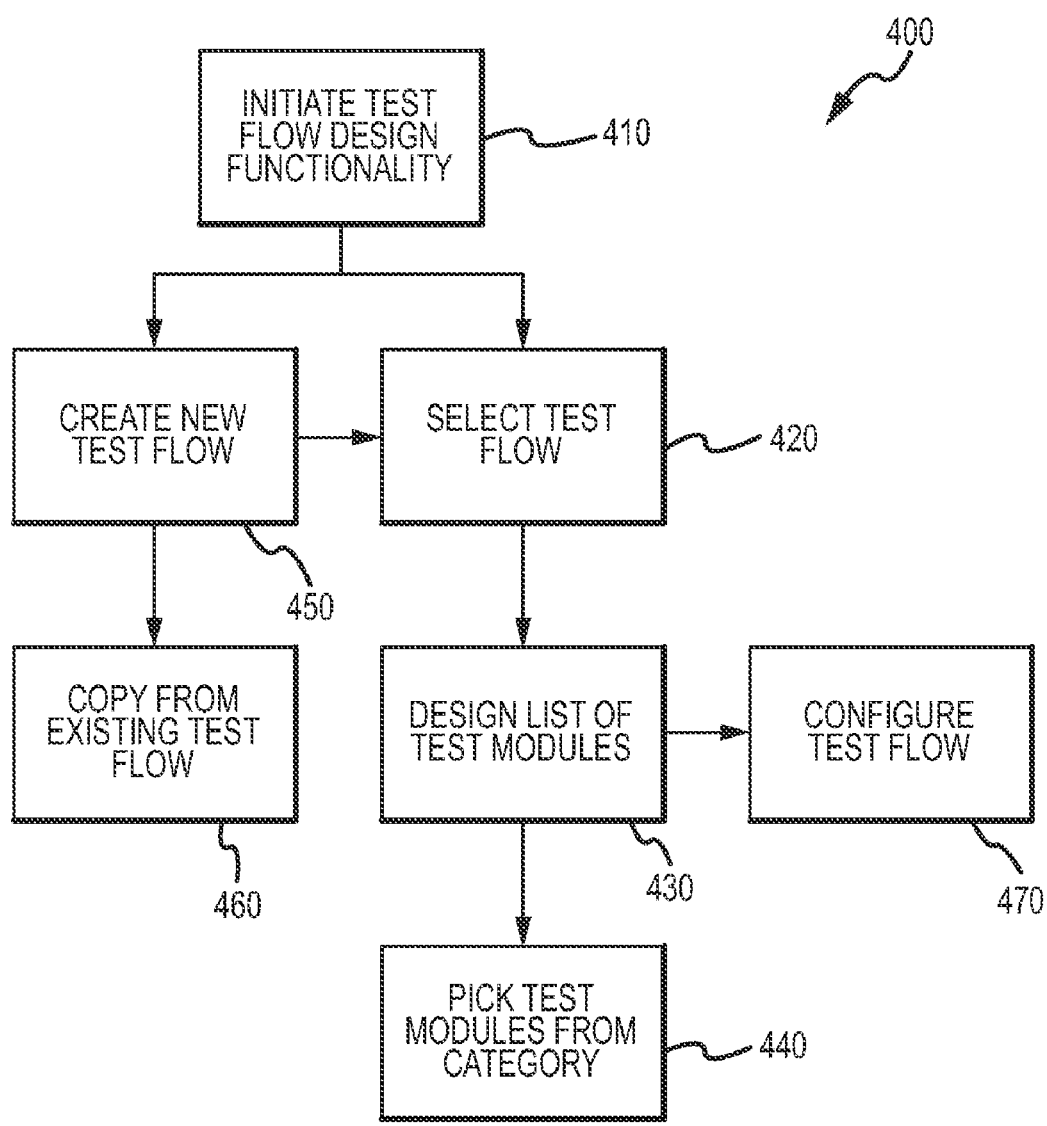
FIG. 4 is a flowchart depicting the functionality for designing a test flow.

Turning now to FIG. 4, a flowchart 400 depicts the functionality that enables a user to design a test flow. Once the compact framework has determined that a user has the characteristic of a test flow designer at step 240 (see FIG. 2), the compact framework initiates the test flow design functionality at step 410. The test flow designer may then create a new test flow at step 450. An optional step 460 is to copy all or part of an existing test flow to create the new test flow at step 450. After the new test flow has been created, a designer may select a test flow to be modified. Alternatively, a test flow designer may start by selecting an existing test flow to be modified at step 420. The designer then chooses the list of test modules to be included in the test flow at step 430. As previously mentioned, the test modules may be organized according to a category such that a test flow designer may more easily access a desired test module. In this regard, a test flow designer may pick test modules from the category listing at step 440, choosing the appropriate test modules that correspond to the needed test routine functions. Again, as many components and functions of the UUT 120 may need to be tested in a single test flow, the test designer may compile a variety of test modules in order to accomplish the desired testing routine. Once the test flow designer has completed the compilation of the test module list at step 430, the test flow designer may configure the test flow at step 470. This may include providing initial input of parameters or adjustments to existing parameters made available for adjustment by the developer of the test module.

Referring back to FIG. 10, a plurality of test flows (e.g., Test Flow 1, Test Flow 2, and Test Flow n) are depicted that correspond to different test routines to be performed. As can be appreciated, each test flow has a variety of test modules 1040 defined within the test flow. For instance, Test Flow 1 is shown comprising test modules 1, 3, 6, 4, and 5. It is to be understood that any number of test modules 1040 may be associated with a test flow in order to accomplish the desired testing routine. Additionally, the order in which the test modules 1040 are executed may be any order specified by the test flow designer. Additionally, a test flow designer may create any number of test flows.

Figure 5:
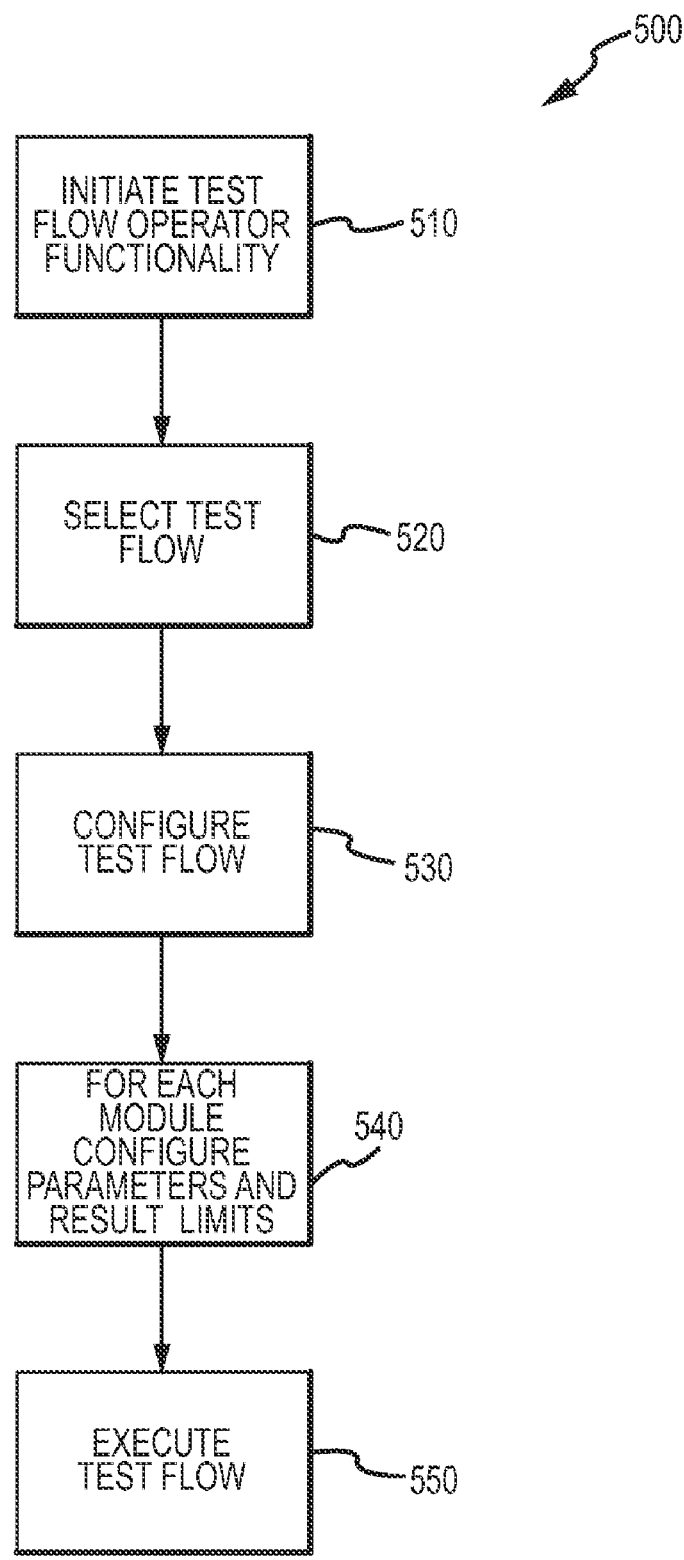
FIG. 5 is a flowchart depicting the functionality for executing a test module.

FIG. 5 illustrates a flowchart 500 representing the functionality for executing a test flow (see step 252 of FIG. 2) is shown. Once the compact framework has correctly determined that a user has the characteristic of a test flow executor (e.g., step 250 of FIG. 2), the compact framework initiates the test flow design functionality at step 510. Next, the executor may select the desired test flow to be executed at step 520. The test flow may then be loaded, and a configuration panel, corresponding to the functionality-specific GUI 140, may be presented to the executor at step 530, such that the executor may make necessary adjustments to the configuration of the test flow. Optionally, at step 540, the test flow executor may configure parameter settings and result limits for each test module. Step 540 is optional in that each test module may have default parameter settings and default result limits associated therewith as provided by the test module developer. Finally, at step 550, the test flow executor executes the test flow such that the compact framework performs each test module included in the specified test flow.

Figure 6:
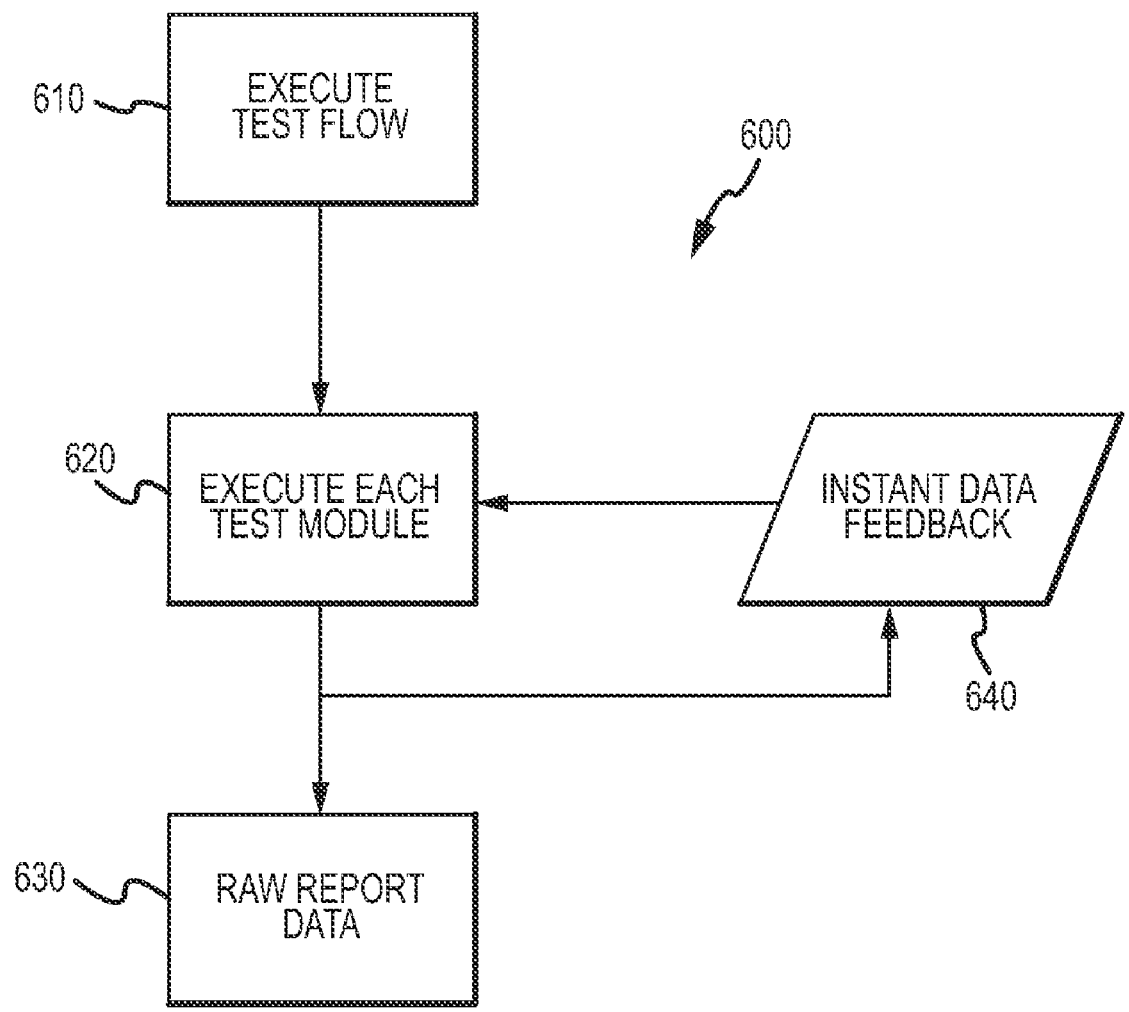
FIG. 6 is a flowchart depicting an alternate functionality for developing a test module.

An alternative embodiment of the execution of a test flow is depicted in a flowchart 600 shown in FIG. 6. At step 610 the test flow executor may initiate the execution of the test flow. At step 620, the compact framework may execute each test module that the test flow designer complied into the test flow. Continuously during this process, instant data feedback is gathered at step 640 from the execution of the test flow and displayed in real time such that the test flow executor may monitor the progress of the test execution in real time. This instant data feedback may also provide data in graphical form for simplified interpretation of the data. Additionally, test module developers may use this instant data feedback when developing test modules to evaluate performance and progress of the test module when executed in real time. At step 630, the raw data associated with the execution of each test module may be compiled into one or more reports.

Figure 7:
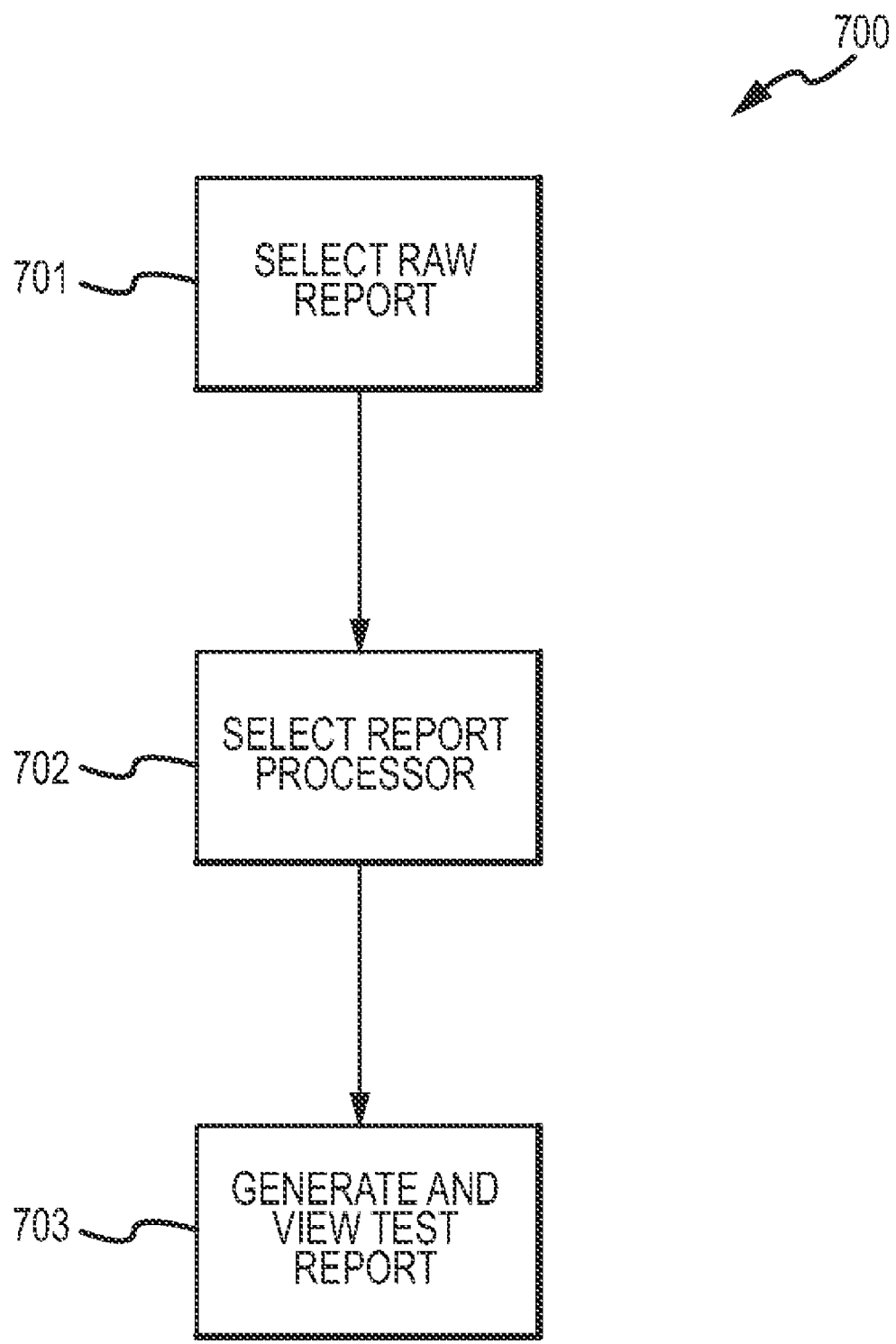
FIG. 7 is a flowchart depicting the processing of test flow results.

A flowchart 700 that depicts associated results processing for formatting the raw results data is shown in FIG. 7. The test flow executor begins by selecting the desired raw report data in step 701. The compact framework may also include report processors that are operative to transform the raw data collected during the test module execution 600 into human readable test reports. The test flow executor may select the appropriate test report processor at step 702. At step 703, the selected reports processor of 702 operates to transform the selected raw test data selected in step 701 to generate a test report. This test report may include data regarding the performance of the UUT 120 during the test flow and report values associated with its performance, or may include "pass" and "fail" designations for various testing modules or components.

Figure 8:
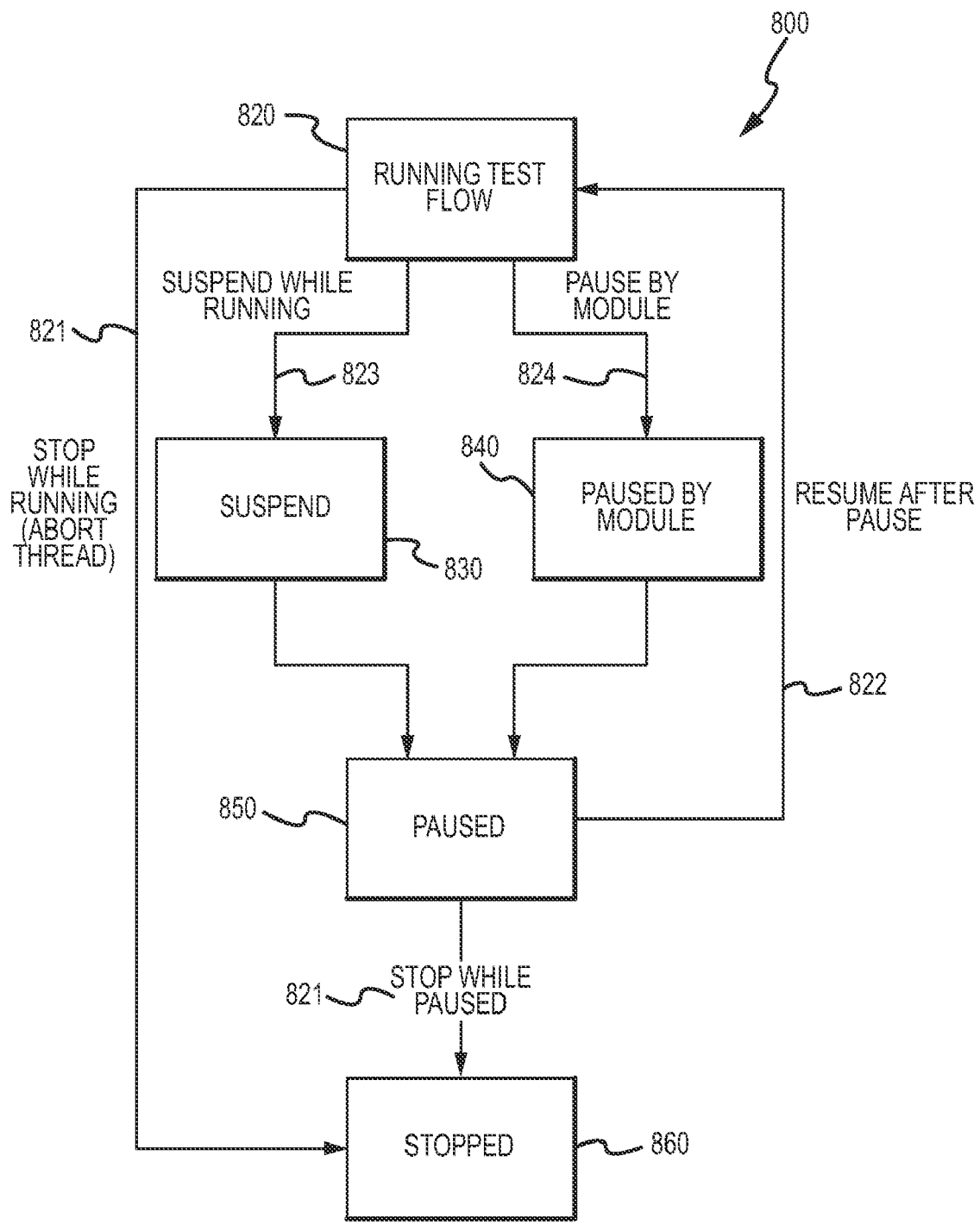
FIG. 8 is a flowchart depicting two methods for pausing a test flow during execution.

During the execution of a test flow, a test executor may control the operation of the test flow as shown in the flowchart 800 of FIG. 8. At step 820, the test flow is in a running state such that the execution of the test flow 600 is in progress. The test flow executor may give a "stop" command 821 such that the test flow goes from a running state 820 directly to a stopped condition 860. This command aborts the execution of the test flow. Alternatively, the test flow executor may enter a "suspend" command 823. This places the test flow in a suspended state 830 such that the compact framework stops execution of the test flow at the thread then running in the current test module being executed in the test flow. The test flow may then proceed to a paused state 850.

Alternatively, as the test flow is running, the test flow executor may enter a "paused by module" command 824. This instructs the compact framework to pause the execution of the test flow at the completion of the currently executing test module. The compact framework may then place the test flow in a paused-by-module state 840. When the currently running module is completed, the test flow proceeds to a paused state 850. While in the paused state, the test flow executor may enter a "stop" command 821 to place the test flow in the stopped state 860. The test flow executor may also enter a "resume" command 822 to return the test flow to the running state 820. The "resume" command 822 may instruct the test flow to immediately return to the running state 820, or to return to the running state after a condition has been met (e.g. a predetermined period of time has elapsed, the device is at a certain temperature, or the like).

Figure 9:
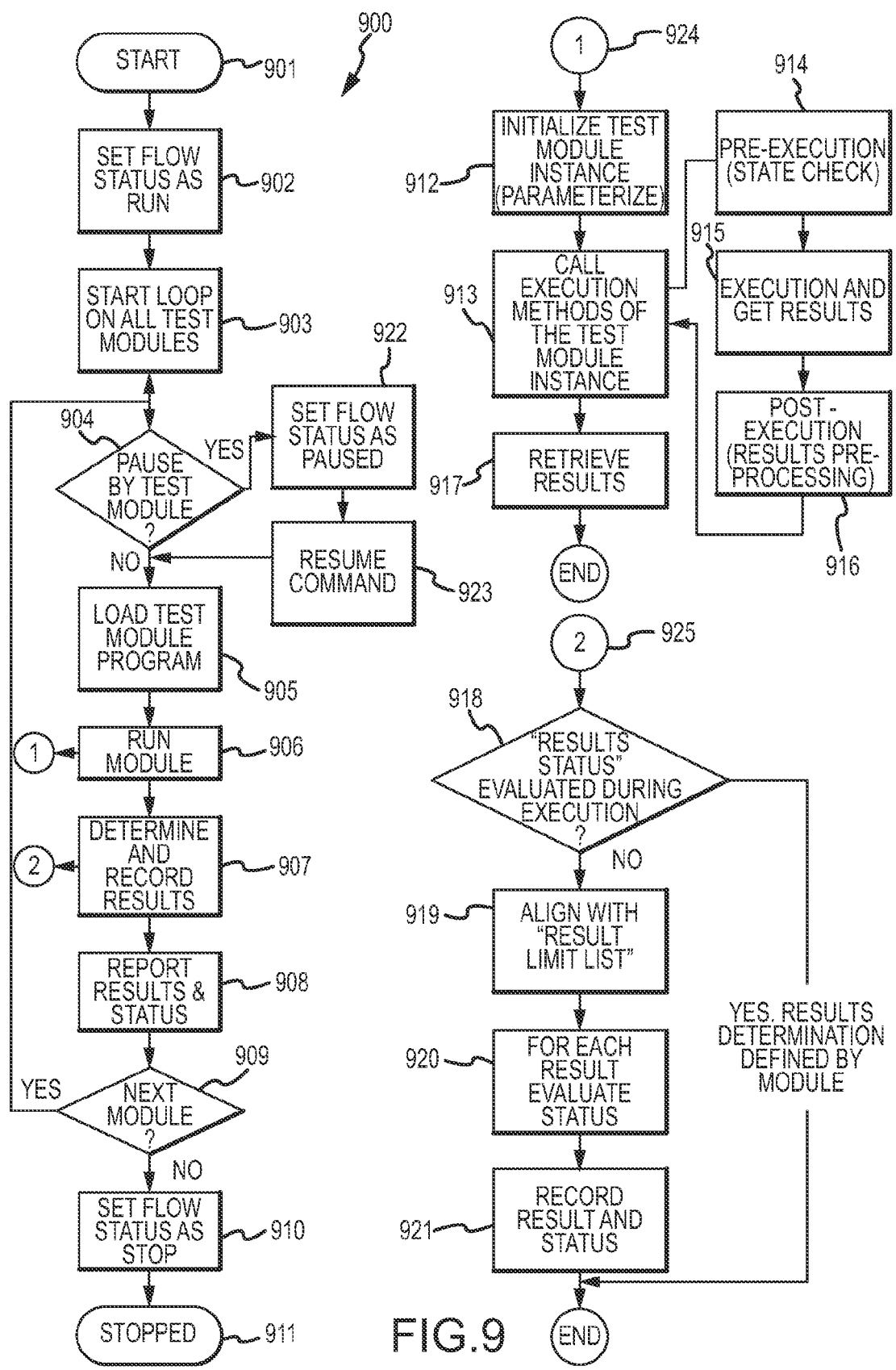
FIG. 9 is a detailed flowchart showing the execution of a test flow.

FIG. 9 illustrates a detailed flowchart 900 of a method for executing a test flow. The execution of the test flow starts at step 901. Initially, the status of the test flow is set to "run" at step 902. The compact framework then initiates the process to execute each test module associated with the test flow at step 903. Step 904 determines if a test flow executor has entered a module pause command 824. If a module pause command 824 has been entered, the process proceeds to step 922 and the test flow status is set to "pause." Upon a resume command at step 923, the test flow is set back to "run" and continues. If the module pause command 824 is not entered by the executor, the test flow proceeds directly to step 905. At step 905, the test module program is loaded so it can be executed.

At step 906 the test module begins to run by executing subroutine 1 (924). The test flow then proceeds to step 912, where the test module is initialized for the test flow. This involves loading the test parameters defined by the test module developer, test flow designer, or test flow executor. The test module instance begins execution at step 913. The test module instance refers to the test module after it has been parameterized in step 912 such that a specific test module instance is run for the particular test module. The test flow then proceeds to a pre-execution check at step 914, then to execution and results gathering step 915, and finally to results pre-processing at step 916. The results are then retrieved at step 917.

The test flow then proceeds to step 907 wherein the results are recorded by executing subroutine 2 (925). At step 918, the compact framework first determines if the status of the results have been evaluated during the execution of the test module. In the instance that the results processing has been defined in the results processing data of the test module, the results are processed according to this definition and the process continues to step 908. If the results processing has not been defined in this manner, the results are aligned with the input result limits at step 919. At step 920, the results are evaluated 920 and recorded 921. At step 908 the results and results status are then reported to the test flow executor. The compact framework then checks the test flow to determine if there is another test module to execute, step 909. If so, the process loops back to step 904. If not, the process proceeds to step 910 and the status of the test flow is set to "stop" at step 910. The test flow is then terminated at step 911.

As can be appreciated, the individual test flows may not store separate instances of each test module. For example, in step 912, when each test module is executed within the test flow, a test module instance is initialized. This test module instance is accessed by the test flow, yet may remain in a single memory location. As such, when a test module developer modifies a test module, there is no need to update all test flows that employ that test module. That is, the modified test module will be executed by each test flow that employs that test module. This prevents the possibility that an outdated or obsolete test module will continue to be employed by a test flow. This also prevents test designers from having to continually update test flows to reflect the newest version of each test module in the test flows. As the test module is initialized with each test flow, the most current version of the test module will be initialized. Similarly, multiple test flows may utilize a single test module in this fashion. For example, as shown in FIG. 10, test module 4 is included in Test Flow 1, Test Flow 2, and Test Flow n. In this case, each test flow would access the instance of test module 4 during execution.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed:

1. A system for automated testing using a compact framework, comprising:
    a plurality of functionalities that include at least one of the following: development of a test module, development of a test flow, and execution of a test flow;
    a first graphical user interface corresponding to said plurality of functionalities, said first graphical user interface operable to receive information relating to a user;
    an authenticator operable to analyze said information relating to said user to determine a characteristic of said user, said characteristic defining one of said functionalities that may be performed by said user; and
    a second graphical user interface corresponding to said one of said functionalities that may be performed by said user, said second graphical user interface operable to receive information relative to said one of said functionalities.

2. A system as set forth in claim 1, further comprising:
    automated test equipment operative to execute said compact framework to test a unit.

3. A system as set forth in claim 2, further comprising:
    a plurality of said automated test equipment.

4. A system as set forth in claim 1, further comprising:
    a data display that is operable to display real time data associated with execution of said compact framework.

5. A system as set forth in claim 4, wherein said data display is operative to display graphical representations of said real time data.

6. A system as set forth in claim 1, wherein said compact framework further comprises:
    a results processor operative to format data into a plurality of user-defined report formats.

7. A system as set forth in claim 1, wherein said development of a test module includes modification of a source code, and wherein said compact framework is operative to compile and load said source code.

8. A system as set forth in claim 7, wherein said compact framework is operative to dynamically execute said source code at runtime.

9. A system as set forth in claim 1, wherein said development of a test module includes specifying an external procedure call.

10. A method for automated testing using a compact framework, comprising:
    receiving, using a graphical user interface associated with said compact framework, information relating to first and second users; and
    using one or more computer processors:
        executing said compact framework;
        analyzing said information relating to said first user to determine a characteristic of said first user;

defining one or more functionalities that include development of a test module, development of a test flow, and execution of a test flow;

providing at least one of said one or more functionalities to said first user dependent upon said characteristic of said first user;

discontinuing said providing step;

analyzing said information relating to said second user to determine a characteristic of said second user; and providing at least one of said one or more functionalities to said second user dependent upon said characteristic of said second user, wherein said at least one of said one or more functionalities is different for said second user and said first user.

11. A method as set forth in claim 10, wherein said test flow comprises a plurality of test modules.

12. A method as set forth in claim 10, further comprising: displaying real time data that relates to said execution of said compact framework.

13. A method as set forth in claim 10, further comprising: executing a test module;

generating raw result data from said execution of a test module; and generating a report using said raw result data that is formatted into a user defined report format.

14. A method as set forth in claim 10, further comprising: executing a test module;

executing a test flow that includes said test module;

receiving a command; and in response to said command, pausing execution of said test flow such that said test flow suspends execution of said test module.

15. A method as set forth in claim 14, further comprising: resuming execution of said test flow.

16. A method as set forth in claim 10, further comprising: executing a test module;

executing a test flow that includes said test module;

receiving a command; and in response to said command, pausing execution of said test flow after the completion of the execution of said test module.

17. A method as set forth in claim 16, further comprising: resuming execution of said test flow.

18. A compact framework for automated testing, comprising:

a test module development component operative to develop and define a test module;

a plurality of test modules, wherein each of said test modules includes parameter data and result processing data, and wherein each of said plurality of test modules is operative to perform a test on a unit under test;

a configuration module operative to define a test flow comprising at least one of said plurality of test modules; and an execution module operative to execute said test flow;

wherein said test module, said configuration module, and said execution module are performed by one or more users dependent upon a characteristic of said one or more users.

19. A compact framework for automated testing as set forth in claim 18, further comprising:

a result report comprising raw data generated by said execution module that is formatted in response to an input of said one or more users.

* * * * *